(12) United States Patent
Rath

(10) Patent No.: US 11,679,800 B2
(45) Date of Patent: Jun. 20, 2023

(54) HELICAL GEAR TRANSMISSION FOR AN ELECTROMECHANICAL SERVO STEERING WITH AN ASYMMETRICALLY PRETENSIONED FIXED BEARING

(71) Applicants: thyssenkrupp Presta AG, Eschen (LI); thyssenkrupp AG, Essen (DE)

(72) Inventor: Krisztian Rath, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 458 days.

(21) Appl. No.: 16/970,757

(22) PCT Filed: Mar. 5, 2019

(86) PCT No.: PCT/EP2019/055369
§ 371 (c)(1),
(2) Date: Aug. 18, 2020

(87) PCT Pub. No.: WO2019/174963
PCT Pub. Date: Sep. 19, 2019

(65) Prior Publication Data
US 2021/0371005 A1 Dec. 2, 2021

(30) Foreign Application Priority Data
Mar. 15, 2018 (DE) ...................... 10 2018 106 025.4

(51) Int. Cl.
*B62D 5/04* (2006.01)
*F16C 27/06* (2006.01)
(Continued)

(52) U.S. Cl.
CPC ......... *B62D 5/0403* (2013.01); *B62D 5/0409* (2013.01); *F16C 27/066* (2013.01); *F16C 35/077* (2013.01); *F16H 55/24* (2013.01)

(58) Field of Classification Search
CPC ... B62D 5/0403; B62D 5/0409; F16C 27/066; F16C 35/077; F16H 55/24
See application file for complete search history.

(56) References Cited

U.S. PATENT DOCUMENTS

| | | | |
|---|---|---|---|
| 7,748,492 B2 * | 7/2010 | Iwasa | F16C 27/04 180/444 |
| 8,667,858 B2 * | 3/2014 | Fuechsel | F16C 35/045 384/535 |

(Continued)

FOREIGN PATENT DOCUMENTS

| | | |
|---|---|---|
| CN | 102678883 A | 9/2012 |
| CN | 103459237 A | 12/2013 |

(Continued)

OTHER PUBLICATIONS

English Translation of International Search Report issued in PCT/EP2019/055369, dated May 22, 2019.

*Primary Examiner* — Tony H Winner
(74) *Attorney, Agent, or Firm* — thyssenkrupp North America, LLC

(57) ABSTRACT

A helical gear transmission for an electromechanical power-assisted steering mechanism includes a shaft which meshes with a helical gear. The shaft is disposed in a housing and at the first end of said shaft in a drive-side bearing assembly is mounted to rotate about a rotation axis, and at the second end of said shaft in a drive-distal bearing assembly is mounted in the housing. The drive-side bearing assembly has a fixed bearing, and the fixed bearing is enclosed by two bearing shells. On each end side of the fixed bearing one spring element is disposed between the fixed bearing and the respective bearing shell. The spring elements asymmetrically pre-load the fixed bearing such that a pivot axis about (Continued)

which the shaft is pivotable in the direction of the helical gear is disposed in the region of the toothing plane of the shaft and the helical gear.

14 Claims, 3 Drawing Sheets

(51) Int. Cl.
*F16C 35/077* (2006.01)
*F16H 55/24* (2006.01)

(56) References Cited

U.S. PATENT DOCUMENTS

| | | | | |
|---|---|---|---|---|
| 9,568,044 | B2* | 2/2017 | Kang | F16H 57/0006 |
| 10,221,920 | B2* | 3/2019 | Kwon | F16C 35/063 |
| 2004/0222036 | A1* | 11/2004 | Berhard | B62D 5/0409 |
| | | | | 180/444 |
| 2005/0161277 | A1* | 7/2005 | Bock | F16H 55/24 |
| | | | | 74/425 |
| 2007/0102228 | A1* | 5/2007 | Shiina | F16C 25/08 |
| | | | | 180/444 |
| 2012/0272765 | A1 | 11/2012 | Fuechsel et al. | |
| 2014/0020973 | A1 | 1/2014 | Galehr | |
| 2015/0053034 | A1 | 2/2015 | Fuechsel et al. | |
| 2016/0031473 | A1 | 2/2016 | Riepold | |
| 2016/0097424 | A1* | 4/2016 | Hafermalz | F16C 27/04 |
| | | | | 384/535 |
| 2018/0003290 | A1 | 1/2018 | Figura et al. | |
| 2018/0003292 | A1 | 1/2018 | Figura et al. | |

FOREIGN PATENT DOCUMENTS

| | | |
|---|---|---|
| CN | 107542856 A | 1/2018 |
| CN | 107542857 A | 1/2018 |
| DE | 10 2009 054 655 A1 | 6/2011 |
| DE | 10 2010 003 727 A | 10/2011 |
| DE | 10 2010 056 007 A1 | 6/2012 |
| DE | 10 2012 103 147 A1 | 10/2013 |
| DE | 10 2013 003 749 A | 9/2014 |
| DE | 10 2014 105 921 A | 10/2015 |
| DE | 20 2016 103 794 U | 7/2016 |
| DE | 20 2016 103 799 U | 7/2016 |
| JP | 2012-102828 A | 5/2012 |
| KR | 10 1298117 B | 8/2013 |
| KR | 2014 0115605 A | 10/2014 |
| WO | 2015/169844 A1 | 11/2015 |

* cited by examiner

HELICAL GEAR TRANSMISSION FOR AN ELECTROMECHANICAL SERVO STEERING WITH AN ASYMMETRICALLY PRETENSIONED FIXED BEARING

CROSS REFERENCE TO RELATED APPLICATIONS

This application is a U.S. National Stage Entry of International Patent Application Serial Number PCT/EP2019/055369, filed Mar. 5, 2019, which claims priority to German Patent Application No. DE 10 2018 106 025.4, filed Mar. 15, 2018, the entire contents of both of which are incorporated herein by reference.

FIELD

The present disclosure generally relates to a helical gear transmission for an electromechanical power-assisted steering mechanism.

BACKGROUND

In electromechanical power-assisted steering mechanisms, a torque is generated by an electric motor, which is transmitted to a transmission and in said transmission superimposed on the steering torque provided by the driver.

An electromechanical power-assisted steering mechanism of the generic type has an electric servomotor which drives a worm shaft which meshes with a worm gear which is disposed on a steering shaft or directly on a steering pinion, wherein the worm shaft is rotatably mounted in a transmission housing. The worm shaft herein is connected to the motor shaft of the electric servomotor by way of a coupling.

A conventional worm transmission at the drive-side end has a fixed bearing and at the free end has a floating bearing. The requirements specific to the steering mechanism herein require that the worm transmission runs with little noise, i.e. without rattling and knocking, in combination with low friction. To this end, the backlash of the worm transmission should be minimized or eliminated.

In the prior art it is known for the worm gear at a drive-side end to be mounted by way of a first roller bearing which permits a certain degree of tilting movement or pivoting movement transverse to the axial direction, while the worm shaft at the opposite end is rotatably mounted in a second roller bearing, wherein a device for setting the clearance in the engagement of the toothings is provided. On account of the latter, the worm shaft can pivot about the first roller bearing depending on the requirement, so as to guarantee an approximately consistent engagement with the worm gear.

DE 10 2013 003 749 A1 discloses a bearing assembly for a transmission of a power-assisted steering mechanism. The worm shaft at the motor-side end is mounted by way of a fixed bearing, and at the opposite end is mounted by a floating ball bearing. The floating ball bearing herein is impinged with a force by a spring element in such a manner that the worm shaft is pre-loaded toward the worm gear. The fixed bearing comprises a ball bearing which in the radial direction is surrounded by a casing element which has a certain degree of radial deformation capability and radially in the cross section has a convex profile on the internal side or the external side. The ball bearing is supported on the transmission housing by way of said casing element as well as optionally by way of an intervening elastic element, on account of which the worm shaft conjointly with the ball bearing can be tilted about a pivot axis which penetrates the fixed bearing in a centric manner. Axial spring elements composed of elastomers which are disposed between two rings are provided for the axial fastening of the bearing on both sides of the fixed bearing.

Thus, a need exists for a helical gear transmission which has a bearing assembly with improved properties.

DETAILED DESCRIPTION

Figure 1:
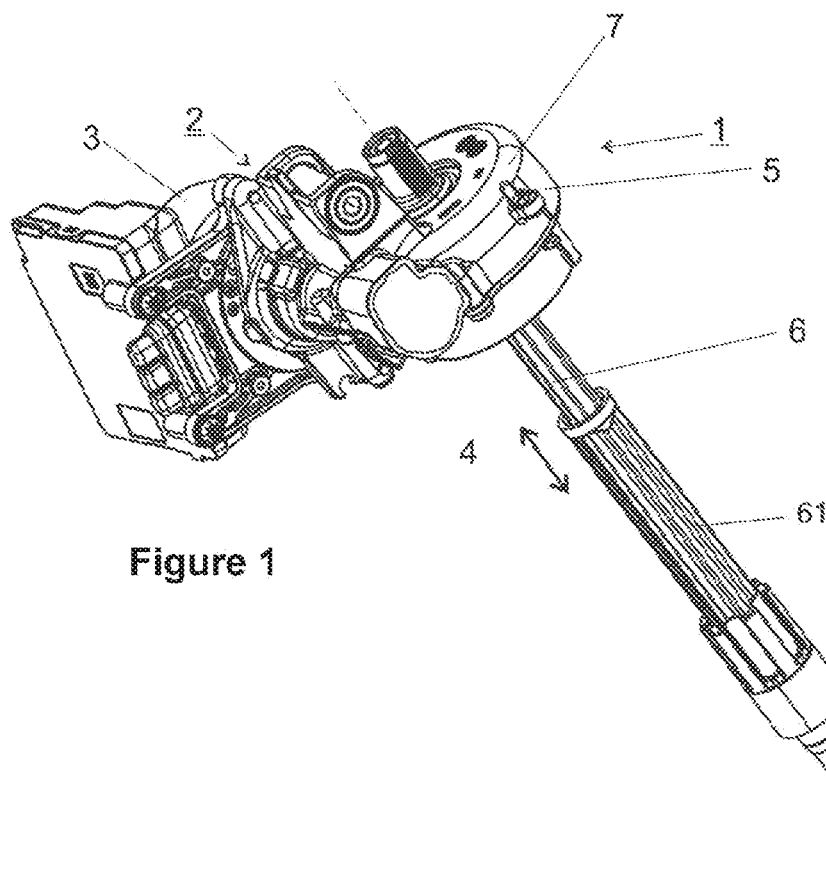
FIG. 1 is a perspective view of a worm gear transmission of an electromechanical steering mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure relates to a helical gear transmission for an electromechanical power-assisted steering mechanism.

Accordingly provided is a helical gear transmission for an electromechanical power-assisted steering mechanism, comprising a shaft which meshes with a helical gear, wherein the shaft is disposed in a transmission housing and at the first end of said shaft in a first bearing assembly is mounted so as to be rotatable about a rotation axis, and at the second end of said shaft in a second bearing assembly is mounted in the transmission housing, wherein the first bearing assembly has a fixed bearing. The fixed bearing is enclosed by two bearing shells, wherein on both end sides of the fixed bearing one spring element is in each case disposed between the fixed bearing and the respective bearing shell, and wherein the spring elements asymmetrically pre-load the fixed bearing in such a manner that a pivot axis about which the shaft is pivotable in the direction of the helical gear is disposed in the region of the toothing plane of the shaft and the helical gear.

The spring elements reduce the axial and torsional stiffness of the bearing fastening. Since a fixed bearing is used, a simple grooved ball bearing can be used. On account of the asymmetrical pre-load, the pivot axis lies in the region of the toothing plane on account of which an impingement with negative force in the fixed bearing can be reduced in a simple manner. The pivot axis preferably runs parallel to the rotation axis in the region of the engagement between the shaft and the helical gear such that no torque in the pivot axis results on account thereof.

Preferably, the first bearing assembly is the drive-side bearing assembly, and the second bearing assembly is the drive-distal bearing assembly.

The first bearing assembly preferably has a bearing outer race which is configured in a rotationally symmetrical manner. The end sides are preferably configured so as to be flat or planar, meaning that said end sides do not have any elevations, chamfers, or recesses. It is conceivable and possible for the pivot axis in the direction of the rotation axis to penetrate the bearing assembly in a centric manner.

In one embodiment, the bearing shells have in each case one seat having at least one projecting step for a spring element, wherein the steps of the two bearing shells define the pivot axis. The bearing shells are particularly preferably shaped in the manner of pots and in the base have a bore for the passage of the shaft, wherein the seat and the projecting step against which the spring element lies are configured on the base. In other words: the seat on the internal side of the bearing shell is formed by a region having a smaller internal diameter. The bearing shells have a bearing shell depth. The bearing shell depth defines a spacing of the bearing shell between the base of the bearing shell and the external circumferential face of the bearing shell. The bearing shell depth by the step is subdivided into a first bearing shell depth and a second bearing shell depth. The first bearing shell depth herein is configured so as to be smaller than the second bearing shell depth. The step thus represents a transition from the first bearing shell depth to the second bearing shell depth. The region having the first bearing shell depth preferably occupies ⅔ of the base circumferential face, or ⅔ of the internal side of the bearing shell in the region of the smaller internal diameter, respectively, while the region having the second bearing shell depth preferably occupies ⅓ of the base circumferential face of the bearing shell. The second region having the larger width is preferably disposed in the circumferential direction of the helical gear.

It is preferable herein for the step in terms of an internal circumference of the bearing shells in the circumferential direction to extend in each case across a defined angular range which extends between 60° and 180°, and preferably between 90° and 120°. In order for the asymmetrical design to be configured, the steps of the two bearing shells in the circumferential direction are preferably identically oriented and mutually opposite.

It is advantageous for the steps of the two bearing shells in the circumferential direction to lie in the region of the helical gear.

The spring elements are preferably annular and have an external diameter which corresponds approximately to the external diameter of the fixed bearing.

In one preferred embodiment the fixed bearing is a roller bearing and/or the spring elements are corrugated springs. It is furthermore conceivable and possible for the spring elements to be disk-shaped flat springs such as, for example, plate springs or spring disks, or to be configured as a spring-lock washer.

It is advantageous for the respective bearing shell on the external circumferential side to have at least one protrusion as an anti-rotation safeguard which engages in communicating recesses of the transmission housing. It can thus be ensured that the bearing assembly is inserted with the correct orientation. It is conceivable and possible for more than one protrusion to be provided on the external circumferential side of the respective bearing shell.

The second bearing assembly preferably has a pre-loading installation by means of which the position of the shaft in terms of the helical gear is adjustable.

The helical gear is preferably a worm gear and the shaft is preferably a worm shaft.

The bearing shells can be made from plastics material.

Furthermore provided is an electromechanical power-assisted steering mechanism comprising an electric motor having a motor shaft, and a previously mentioned helical gear transmission, wherein the motor shaft drives the shaft of the helical gear transmission.

It is advantageous herein for the helical gear to be disposed so as to be rotationally fixed on a steering shaft of a motor vehicle.

When assembling the drive-side bearing assembly, the corrugated springs are in each case preferably positioned in the corresponding bearing shell in the region of the step. The tensioning force is at the maximum in said region. On account of the asymmetrical pre-load of the corrugated spring, the pivoting point of the drive-side bearing assembly can be moved out of the centre of the bearing into the toothing plane of the worm shaft and the worm gear. The worm shaft and the worm gear engage in the toothing plane. A reaction moment arising on account of the toothing forces in the bearing assembly can thus be prevented. Furthermore, asymmetrical tooth separation forces in the different rotating directions of the worm gear can be eliminated, on account of which any asymmetrical friction of the toothing of the worm gear transmission is also suppressed.

FIG. 1 shows a power-assisted steering mechanism 1 which is attached to a steering shaft 6 which is mounted so as to be rotatable about the longitudinal axis L thereof, i.e. the steering shaft axis. The steering shaft 6 in a rear steering shaft part 61 is rotationally fixed but adjustable in the direction of the longitudinal axis L, as is indicated by the double arrow, so as to adjust a steering wheel (not illustrated here) which is attached to a fastening portion 62 in the longitudinal direction.

Figure 2:
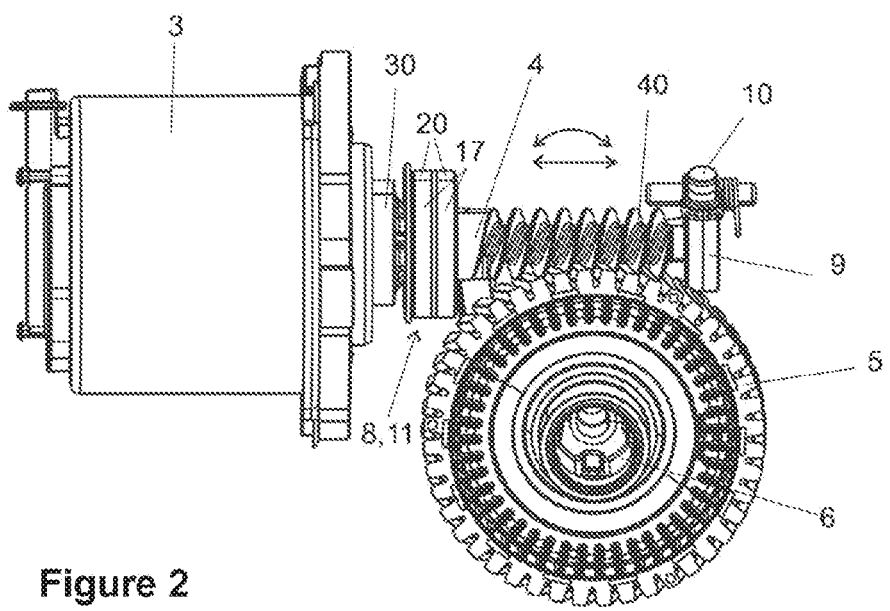
FIG. 2 is a detailed view of the transmission of FIG. 1 reduced to an electric motor and to a worm shaft which is engaged with a worm gear.
Figure 3:
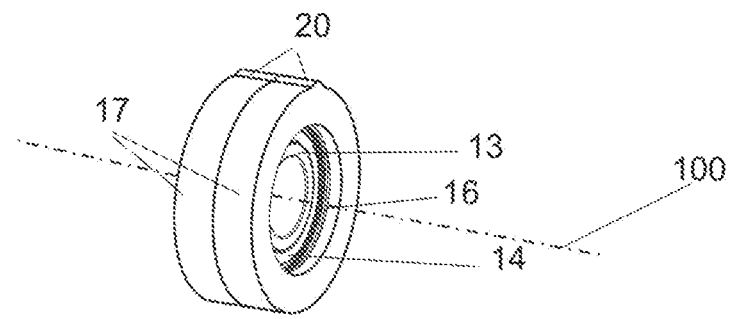
FIG. 3 is a perspective view of the assembled bearing assembly.

The power-assisted steering mechanism has a transmission housing 7 which is omitted in the exploded illustration of FIG. 2. A worm gear 5 which is connected so as to be rotationally fixed to the steering shaft 6 is mounted so as to be rotatable about the longitudinal axis L in the transmission housing 7. A worm shaft 4 meshes with the worm gear 5 so as to form a worm transmission.

An electric motor or a servomotor 3 drives the worm shaft 4 by way of a motor shaft which by way of a coupling 30, composed of two coupling parts, is coupled so as to be rotationally fixed to the worm shaft. The worm shaft 4 by way of the worm 40 thereof engages with a worm gear 5 which is connected so as to be rotationally fixed to a pinion, or so as to be rotationally fixed to the lower steering shaft 6, as is illustrated here. The worm shaft 4 is driven when the electric motor 3 is in operation, and the worm gear 5 correspondingly rotates so as to provide assistance for rotating the lower steering shaft 6.

FIG. 2 shows the worm shaft 4 having a drive-side bearing assembly 8 and a drive-distal bearing assembly 9, and the worm gear 5 which meshes with the worm shaft 4, in a perspective illustration, wherein the components of the transmission housing have been dispensed with.

The worm shaft 4 meshes with the worm gear 5 by way of the worm toothing 40. The worm gear 5 in turn is connected so as to be rotationally fixed to the steering shaft 6 which runs between a steering wheel (not illustrated) and the actual steering gear mechanism of the motor vehicle.

The mentioned construction elements are mounted in a common transmission housing (not illustrated).

The worm shaft 4 herein is mounted in the transmission housing 7 by means of the drive-side bearing assembly 8 and the drive-distal bearing assembly 9. The drive-distal bearing assembly 9 has a roller bearing which is configured as a fixed bearing 11. The position of the worm shaft 4 in relation to the worm gear 5 is adjustable by means of a pre-loading installation 10 in the region of the drive-distal bearing assembly 9. The drive-side bearing assembly 8 has the fixed bearing 11 which by way of a corresponding pre-load in the housing 7 permits pivoting movements about a pivot axis and slight axial movements in relation to the transmission housing.

Figure 4:
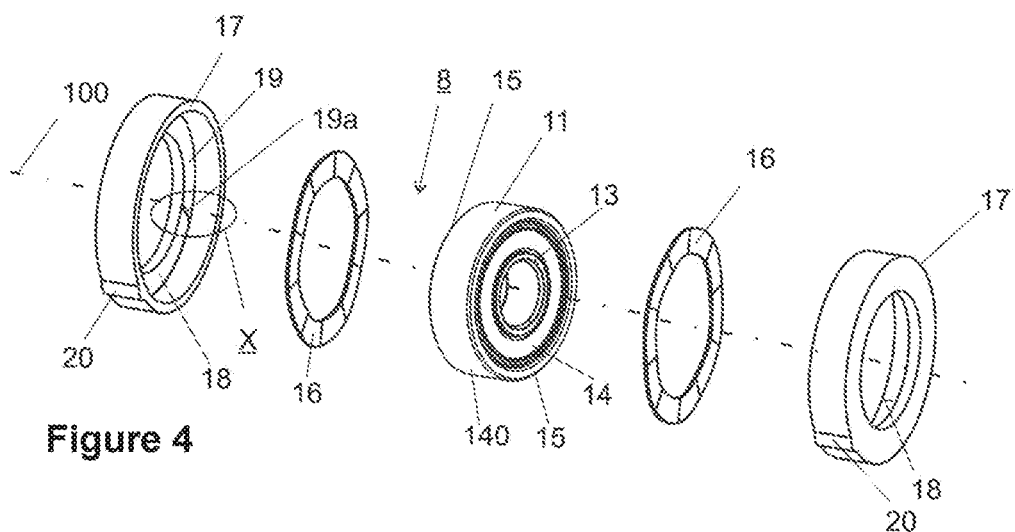
FIG. 4 is an exploded view of the bearing assembly of the worm shaft.
Figure 5:
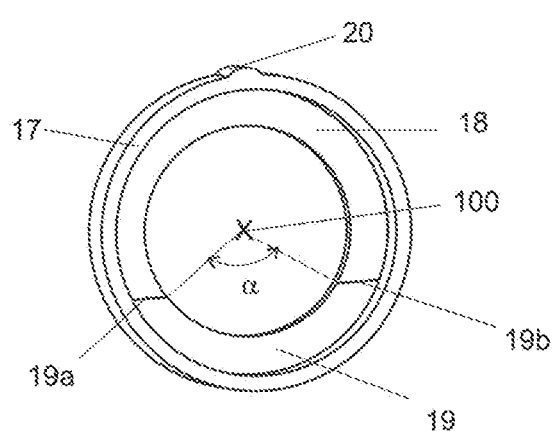
FIG. 5 is a perspective view of a bearing shell of the bearing assembly.
Figure 6:
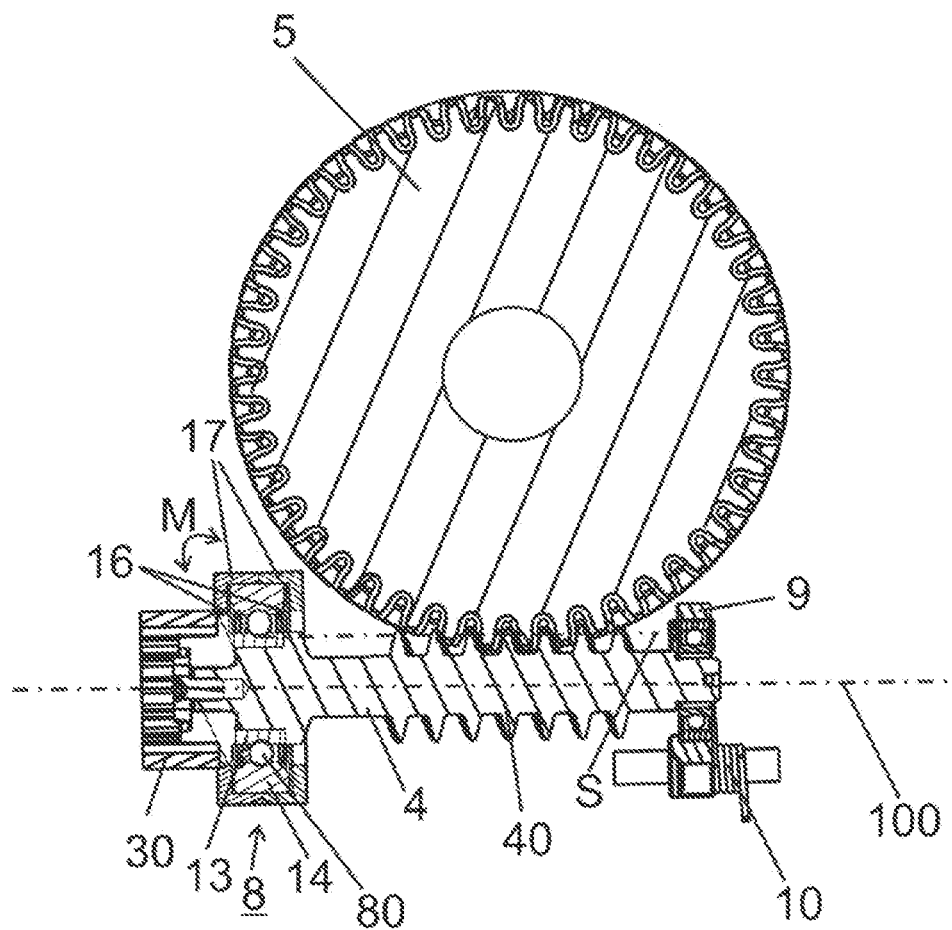
FIG. 6 is a longitudinal sectional view through the worm shaft having the bearing assembly.

The drive-side bearing assembly 8 and the functioning principle thereof is illustrated in detail in FIGS. 3 to 6. As is illustrated in FIG. 6, the fixed bearing 11 has a roller bearing 12 having an inner race 13, rolling members 80, and an outer race 14. The rolling members 80 run in grooves between the inner race 13 and the outer race 14. The outer race 14 is configured in a rotationally symmetrical manner. The inner race 13 has an internal cylindrical casing face for a tight fit on the worm shaft.

The two end sides 15 of the roller bearing 12 lie in each case against a spring element 16, in particular a corrugated spring illustrated here, said corrugated spring ensuring tilting or pivoting of the roller bearing 12. The end sides are flat or planar, meaning that said end sides do not have any elevations, chamfers, or recesses. The corrugated spring 16 herein has an external diameter which corresponds substantially to the external diameter of the outer race 14 of the roller bearing 12. The internal diameter of the corrugated spring 16 can be chosen such that the corrugated spring 16 covers at least part of the inner race 13 of the rolling member 12. The corrugated springs 16 herein are disposed such that the centres of said corrugated springs 16 lie approximately on a rotation axis 100 of the roller bearing 12. The two corrugated springs 16 are preferably of identical configuration. The roller bearing 12 and the two corrugated springs 16 are enclosed by two bearing shells 17 which are shaped so as to be substantially circular-cylindrical and in the non-stressed state surround the fixed bearing in a concentric manner. The bearing shells 17 on the internal side have in each case one seat 18 for a corrugated spring 16. The seat 18 on the internal side is formed by a region having a smaller internal diameter. The seat 18 has a protrusion 19a, 19b in the form of a step 19, as shown in FIGS. 4 to 6. The step 19 protrudes in the direction of the rotation axis 100 and in the radial direction of the rotation axis extends across the entire width of the seat 18. The step 19 along the internal circumference of the bearing shell 17 occupies only part of said internal circumference, preferably a defined angular range a of between 60° and 180° in terms of the internal circumference of the bearing shell 17, as is illustrated in FIG. 5. The seat 18 having the step 19 thus forms an asymmetrical bearing face for the corrugated spring 16 in the bearing shell 17. In order to ensure that the steps 19 are identically oriented and in the installed state of the bearing in the transmission housing are mutually opposite, each bearing shell 17 on the external side has a protrusion 20. The protrusion 20 in the circumferential direction preferably lies opposite the step 19. The transmission housing has a corresponding cutout for the protrusions of the bearing shells. It is thus ensured that the bearing shells, or the drive-side bearing assembly, respectively, can be installed only in one direction.

When assembling the drive-side bearing assembly, the corrugated springs are in each case positioned in the corresponding bearing shells in the region of the step. The tensioning force is at the maximum in this region. On account of the asymmetrical pre-load of the corrugated spring 16, the pivoting point of the drive-side bearing assembly 8 can be moved out of the centre of the bearing into the toothing plane S of the worm shaft 4 and the worm gear 5, as is illustrated in FIG. 6. The worm shaft 4 and the worm gear 5 engage in the toothing plane. A reaction moment arising on account of the toothing forces in the bearing assembly can thus be prevented. Furthermore, asymmetrical tooth separation forces in the different rotating directions of the worm gear can be eliminated, on account of which any asymmetrical friction of the toothing of the worm gear transmission is also suppressed. The pivot axis S in the region of engagement between the worm shaft 4 and the worm gear 5 preferably runs parallel to the rotation axis 100 so that no torque M in the pivot axis results on account thereof.

The depth of the bearing shell 17 in the region of the steps 19, or the height of the step 19, predefines the necessary clearance and pre-load for the corrugated spring. The bearing shells 17 are shaped in the manner of pots, as is illustrated in FIGS. 3 and 4 to 6, and in the base have a bore for the passage of the shaft 4, wherein the seat 18 and the projecting step 19 against which the spring element 16 lies are configured on the base. The bearing shells have a bearing shell depth. The bearing shell depth defines a spacing $d1$, $d2$ of the bearing shell 17 between the base 18 of the bearing shell and the external circumferential face of the bearing shell. The bearing shell depth is subdivided by the step 19 in the region of the protrusions 19a, 19b into a first bearing shell depth $d1$ and a second bearing shell depth $d2$. The first bearing shell depth $d1$ herein is configured so as to be smaller than the second bearing shell depth $d2$. The step 19 by way of the protrusions 19a, 19b thereof thus represents a transition from the first bearing shell depth $d1$ to the second bearing shell depth $d2$. The region having the first bearing shell depth $d1$ preferably occupies ⅔ of the base circumferential face, or ⅔ of the internal side of the bearing shell 17 in the region of the smaller internal diameter, respectively, while the region having the second bearing shell depth $d2$ preferably occupies ⅓ of the base circumferential face of the bearing shell 17. The second region having the larger width is preferably disposed in the circumferential direction of the helical gear 5.

Figure 4A:
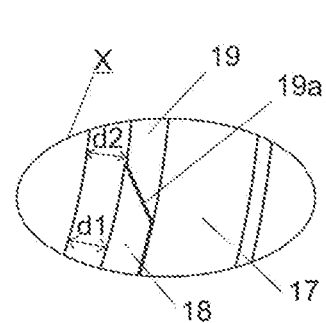
FIG. 4a is an enlarged view of the internal side of the bearing shell from FIG. 4.

The step 19 by means of the protrusions 19a, 19b represents a transition from a first region having a first bearing shell depth $d1$ to a second region having a second bearing shell depth $d2$, as is illustrated in FIG. 4a. The spacing of the bearing shells 17 between the seat 18 and the external circumferential face of the bearing shell 19 is to be understood to be the bearing shell depth in the region of the step. The first depth $d1$ herein is configured so as to be smaller than the second depth $d2$. The second region having the larger depth $d2$ is preferably disposed in the circumferential direction of the worm gear 5.

The bearing shells are preferably formed from plastics material, in particular by injection-molding.

What is claimed is:

1. A helical gear transmission for an electromechanical power-assisted steering mechanism, comprising:

a transmission housing, a helical gear, a shaft disposed in the transmission housing and meshed with the helical gear, the shaft including a first end mounted in a drive-side bearing assembly so as to be rotatable about a rotation axis, and a second end in a drive-distal bearing assembly, wherein the drive-side bearing assembly has a fixed bearing enclosed by two bearing shells, and a pair of spring elements, each of the pair of spring elements disposed between the fixed bearing and a respective one of the two bearing shells, wherein the spring elements asymmetrically pre-load the fixed bearing in such a manner that a pivot axis about which the shaft is pivotable in a direction of the helical gear is disposed in a region of a toothing plane of the shaft and the helical gear.

2. The helical gear transmission of claim 1 wherein each of the bearing shells has one seat with at least one projecting step configured for one of the pair of spring elements, wherein the steps of the two bearing shells define the pivot axis.

3. The helical gear transmission of claim 1 wherein the at least one step in terms of an internal circumference of the bearing shells in a circumferential direction extends in each case across an angular range between 60° and 180°.

4. The helical gear transmission of claim 1 wherein the steps of the two bearing shells in a circumferential direction are identically oriented and mutually opposite.

5. The helical gear transmission of claim 4 wherein the steps of the two bearing shells in the circumferential direction lie in a region of the helical gear.

6. The helical gear transmission of claim 1 wherein the spring elements are annular and have an external diameter which corresponds approximately to an external diameter of the fixed bearing.

7. The helical gear transmission of claim 1 wherein the fixed bearing is a roller bearing.

8. The helical gear transmission of claim 1 wherein the spring elements are corrugated springs.

9. The helical gear transmission of claim 1 wherein the bearing shells on an external circumferential side thereof each having at least one protrusion configured to provide an anti-rotation safeguard that engages in communicating recesses of the transmission housing.

10. The helical gear transmission of claim 1 wherein the drive-distal bearing assembly has a pre-loading installation configured to permit adjustability of a position of the shaft relative to the helical gear.

11. The helical gear transmission of claim 1 wherein the helical gear is a worm gear and the shaft is a worm shaft.

12. The helical gear transmission of claim 1 wherein the bearing shells are made from plastics material.

13. An electromechanical power-assisted steering mechanism, comprising:

an electric motor having a motor shaft, and a helical gear transmission housing, comprising:

a helical gear, a shaft disposed in the transmission housing and meshed with the helical gear, the shaft including a first end mounted in a drive-side bearing assembly so as to be rotatable about a rotation axis, and a second end in a drive-distal bearing assembly, wherein the drive-side bearing assembly has a fixed bearing enclosed by two bearing shells, and a pair of spring elements, each of the pair of spring elements disposed between the fixed bearing and a respective one of the two bearing shells, wherein the spring elements asymmetrically pre-load the fixed bearing in such a manner that a pivot axis about which the shaft is pivotable in a direction of the helical gear is disposed in a region of a toothing plane of the shaft and the helical gear, and wherein the motor shaft drives the shaft of the helical gear transmission.

14. The electromechanical power-assisted steering mechanism of claim 13 wherein the helical gear is disposed so as to be rotationally fixed on a steering shaft of a motor vehicle.

* * * * *